J. B. ROCHE.
ELECTRIC MACHINE.
APPLICATION FILED JAN. 21, 1914.
1,125,913.  Patented Jan. 19, 1915.
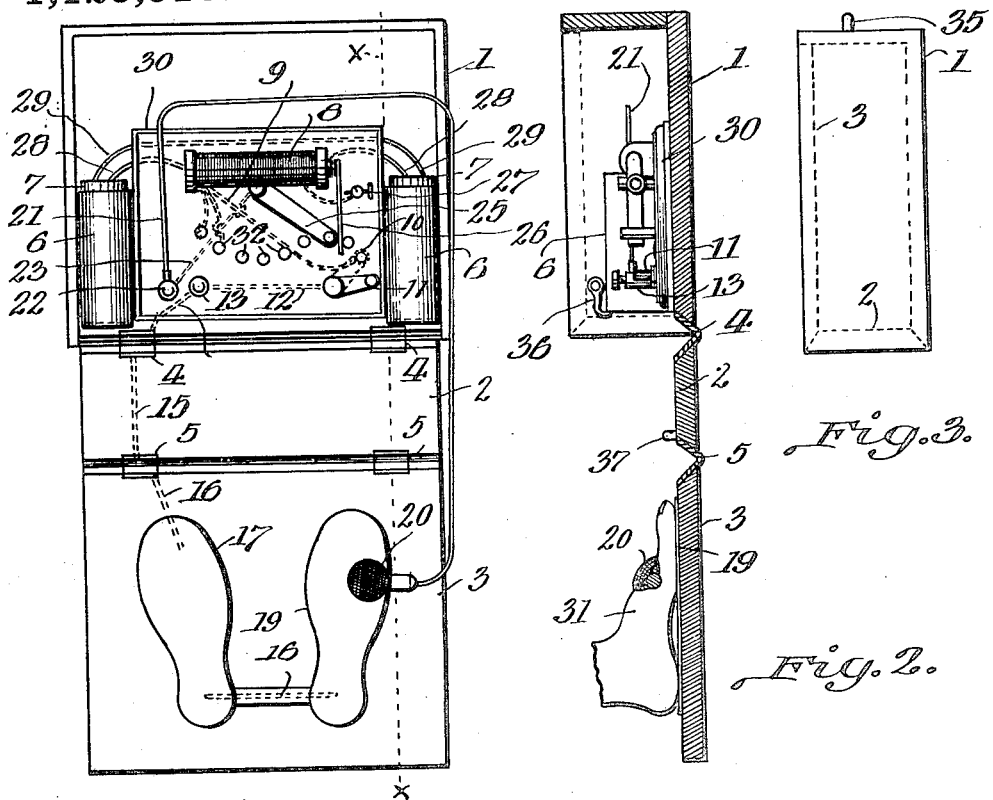
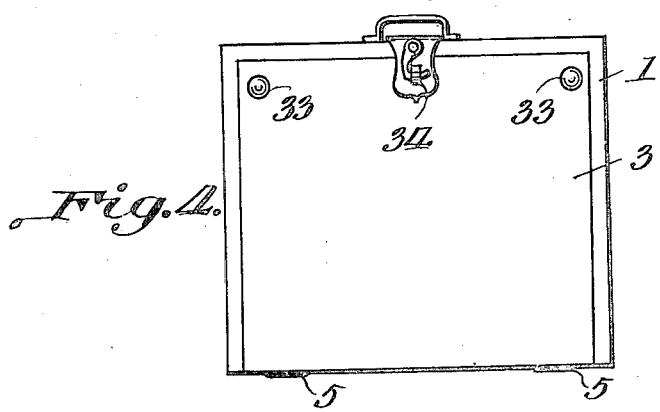
Witnesses
W. P. Powell
A. W. Snowdon
Inventor
John B. Roche
By Ithiel J. Cilley
Attorney

UNITED STATES PATENT OFFICE.

JOHN B. ROCHE, OF GRAND RAPIDS, MICHIGAN.

ELECTRIC MACHINE.

1,125,913. Specification of Letters Patent. Patented Jan. 19, 1915.

Application filed January 21, 1914. Serial No. 813,458.

*To all whom it may concern:*

Be it known that I, JOHN B. ROCHE, a citizen of the United States, residing at Grand Rapids, in the county of Kent and State of Michigan, have invented certain new and useful Improvements in Electric Machines, of which the following is a specification.

My invention relates to improvements in the containing cases for storing and carrying electric machines that are constructed and equipped for medicinal purposes, and its objects are: First, to provide a case in which the entire electrical appliances may be stored and carried in the smallest possible space and with each individual part in position to be made readily available. Second, to provide a case for storing and carrying electro-medical appliances with which the energizing appliances and the transmission appliances are permanently fixed in the case and each may be made to assume its proper position when the case is opened and ready for use, and, third, to provide a means for properly transmitting the electric current to the desired points, and to successfully transmit the same through the patient, or any desired portion of the patient. I attain these objects by the mechanism illustrated in the accompanying drawing in which—

Figure 1 is a plan of the case and its electric appliances in position for use. Fig. 2 is a sectional view of the same on the line $x$ $x$ of Fig. 1. Fig. 3 is an end view of the case closed, and Fig. 4 is a front view of the same.

Similar figures of reference indicate similar parts throughout the several views.

This case is designed to close up, and stand, normally, upon one of the narrow edges, as indicated in Figs. 3 and 4, and the part marked 1 is the containing case for the electrical appliances. To the lower end of this case is hinged a bottom 2, beveled or mitered at each edge to form a right angled construction when the case is closed, and so arranged that both the bottom 2 and the cover 3 may be made to lie upon the same plane with the bottom of the back side of the case 1. The bottom 2 is pivotally connected with the back of the case 1, and to the front of the case 3 by means of hinges 4 and 5, as indicated in Figs. 1, 2 and 4, and the transmission plates 17 and 19 are secured to the inner surface of the cover 3, and are electrically connected by means of a metallic wire, as indicated at 18.

In this machine electricity is generated in the batteries 7 7, in the usual manner, and conducted, by means of the metallic conductors 28 and 29 to, and through the electromagnet 8 by means of which the armature 26 is made to alternately make and break the contact with the post 27. In operation the electric current is conducted from the batteries 7 7 through 8 over the metallic conductor indicated at 9 to the post 10, when by connecting the switch 11 with 10 the current is conducted over the wire 12 to the post 13, thence over the wire 14 to one of the hinges 4, and over the wire 15 to one of the hinges 5 and thence over the wire 16 to the metallic conductor plates 17 and 19, and to complete the circuit the sponge 20 is applied to the subject, as indicated at 20—31 in Fig. 2, whence the current is carried over the wire 21 to the post 22, and thence over the wire 23 to the switch 25, and by carrying the switch 25 in contact with any one of the posts 32 the current is completed. It will be readily understood that by this line of wiring, and by utilizing one pair of the hinges 4—5 in the line of electric conductors the case may be opened and closed, spread out perfectly flat or given the desired form and positions without in any way interfering with the electrical appliances or necessitating the adjustment or changing of any of its parts except the necessary switches 25 and 11.

At 6 6 I have shown cases for the reception of the batteries 7 7, and at 30 I have shown the ordinary base for supporting the several electric appliances necessary in the make up of the machine, though not a part of my present invention, but shown to indicate the application of my case to this form of electric machine. This case is designed to be placed upon the floor in such a manner that a patient may stand upon the contact plates, or to be held in vertical position so a patient may lie in bed or in any convenient position and place the feet upon the contact plates, as indicated in Fig. 2.

The rubber feet 33, 33 are placed at the upper edge of the front of the case to hold this edge up so the weight of the patient will not be borne by the catch loop 34.

35 indicates the handle by means of which the case is to be carried, and 36 represents a hook, and 37 an eye by means of which the bottom of the case is secured to the body.

What I claim as new, and desire to secure by Letters Patent of the United States, is:

1. In combination with an electric machine, a case therefor made up of a body inclosed at the back, the ends and one side, a bottom pivoted to the back with metallic hinges, a front pivoted to the bottom with metallic hinges, contact plates secured to the front, and metallic connection from the electric machine through the hinges to the contact plates, and a return conductor, as shown and described.

2. In combination with an electric machine and batteries, a case therefor made in three parts, a body, a bottom and a front, the bottom pivotally secured to the body at one edge, and to the front at the other edge with metallic hinges, contact plates secured to the front, electric conductors from the batteries through the hinges to the plates and means for securing the bottom and the front to the body in closed form.

3. In combination with an electric machine and battery, a case therefor arranged to be opened with the back, bottom and front upon the same plane, and means for conducting an electric current from the battery to the front when the case is opened without readjustment of the electrical parts.

Signed at Grand Rapids Michigan January 5 1914.

JOHN B. ROCHE.

In presence of—
  I. J. CILLEY,
  CHAS. V. HILDING.